US009444248B2

(12) United States Patent
Erhart

(10) Patent No.: US 9,444,248 B2
(45) Date of Patent: Sep. 13, 2016

(54) CONTROL CIRCUIT FOR LIMITING A LOAD CURRENT, CHARGING CIRCUIT AND MOTOR VEHICLE

(75) Inventor: Michael Erhart, Hart bei Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 517 days.

(21) Appl. No.: 13/592,572

(22) Filed: Aug. 23, 2012

(65) Prior Publication Data

US 2013/0049686 A1 Feb. 28, 2013

Related U.S. Application Data

(60) Provisional application No. 61/526,329, filed on Aug. 23, 2011.

(30) Foreign Application Priority Data

Nov. 11, 2011 (EP) ..................................... 11188801

(51) Int. Cl.
*H02J 7/00* (2006.01)
*H02H 9/02* (2006.01)

(52) U.S. Cl.
CPC ..................................... *H02H 9/025* (2013.01)

(58) Field of Classification Search
CPC ........ H02H 9/025; H02H 9/02; H02H 9/001; H02H 9/002; B60L 11/1814; B60L 11/1816; B60L 3/0069
See application file for complete search history.

(56) References Cited

U.S. PATENT DOCUMENTS

| 4,661,879 | A  | * | 4/1987 | Sato et al. ....................... 361/58 |
| 5,786,682 | A  | * | 7/1998 | Aiken et al. ................... 320/136 |
| 7,580,234 | B2 | * | 8/2009 | Tamosaitis .................... 361/93.9 |
| 8,526,149 | B2 | * | 9/2013 | Cheng et al. .................... 361/58 |
| 2007/0108959 | A1 | * | 5/2007 | Amano .......................... 323/351 |

FOREIGN PATENT DOCUMENTS

DE     200 10 283 U1     7/2001

* cited by examiner

*Primary Examiner* — Nha Nguyen
(74) *Attorney, Agent, or Firm* — Lewis Roca Rothgerber Christie LLP

(57) ABSTRACT

A control circuit for indirectly limiting a load current which flows through a controllable semiconductor component. The control circuit controls the controllable semiconductor component based upon a measured and/or a calculated load-current-dependent power loss of the semiconductor component. The control circuit can also control the controllable semiconductor component based upon a measured and/or a calculated load-current-dependent component temperature of the controllable semiconductor component. A charging circuit includes a controllable semiconductor component for limiting a load current and has a control circuit in accordance with the invention. A motor vehicle includes an on-board electrical power supply system having a charging circuit in accordance with the invention.

14 Claims, 5 Drawing Sheets

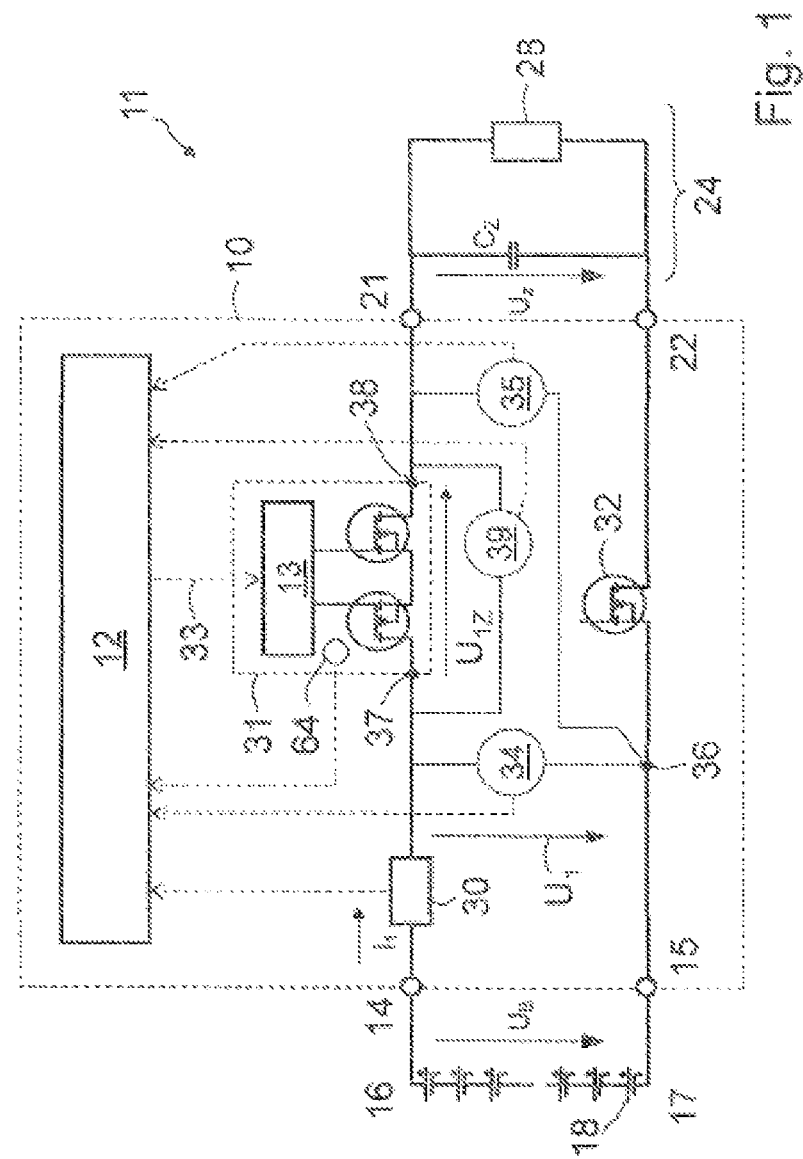

CONTROL CIRCUIT FOR LIMITING A LOAD CURRENT, CHARGING CIRCUIT AND MOTOR VEHICLE

CROSS-REFERENCE TO RELATED APPLICATIONS

The present application claims priority under 35 U.S.C. §119 to European Patent Application No. EP 11188801.2 (filed on Nov. 11, 2011), which claims priority to U.S. Provisional Patent Application No. 61/526,329 (filed on Aug. 23, 2011), which are each hereby incorporated by reference in their respective entireties.

FIELD OF THE INVENTION

Embodiments of the invention relates to first and second control circuits which respectively indirectly limit a load current flowing through a controllable semiconductor component. The limiting of the load current is designated here as indirect limiting because it is carried out by way of a controllable semiconductor component which is not necessarily part of the control circuit.

Moreover, embodiments of the invention relate to a charging circuit comprising a controllable semiconductor component for limiting a load current.

Embodiments of the invention further relate to a motor vehicle comprising an on-board electrical power supply system.

BACKGROUND OF THE INVENTION

The electrical precharging of an intermediate circuit is generally carried out via a resistor that is connected in. Hitherto, relays have been used for the main switches. In the future, electronic switches will increasingly be used instead of the relays.

German Patent Publication No. DE 195 46 132 A1 discloses a charging circuit that limits a turn-on current by way of a semiconductor component (e.g., MOSFET). After turn-on, a time-determining RC element of a control circuit applies a gate voltage to a gate of the semiconductor component, the gate voltage causing the semiconductor component to enter into linear operation. It is only after a delay time, which is dependent on the time constant of the RC element, that the RC element applies to the semiconductor component a gate voltage that activates the semiconductor component.

SUMMARY OF THE INVENTION

Embodiments of the present invention provide a charging circuit and a control circuit for a charging circuit by which a charging time can be shortened. Embodiments of the present invention further provide a motor vehicle whose on-board power supply system has a charging circuit having a shortened charging time. In particular, it is preferred to shorten the charging time without changing the semiconductor component.

In accordance with embodiments, a control circuit is provided which indirectly limits a load current which flows through a controllable semiconductor component, the control circuit being configured to control a controllable semiconductor component based in part or on a whole upon a measured and/or calculated load-current-dependent power loss of the semiconductor component.

In accordance with embodiments, a control circuit is provided which indirectly limits a load current which flows through a controllable semiconductor component, the control circuit being configured to control a controllable semiconductor component based in part or on a whole upon a measured and/or calculated load-current-dependent component temperature of the controllable semiconductor component.

In accordance with a first embodiment, a control circuit is provided which indirectly limits a load current, by virtue of the fact that the control circuit is configured to control the controllable semiconductor component based in part or on a whole upon a measured and/or calculated load-current-dependent power loss of the semiconductor component. This is advantageous since it makes it possible to lead the semiconductor component along its differential-voltage-dependent thermal loading capacity limit during the charging process (based upon a sufficient safety margin in the set of characteristic curves).

In accordance with a second embodiment, a control circuit is provided which indirectly limits a load current, by virtue of the fact that the control circuit is configured to control a controllable semiconductor component based in part or on a whole upon a measured and/or calculated load-current-dependent component temperature of the controllable semiconductor component. This is advantageous since it makes it possible to lead the semiconductor component along its differential-voltage-dependent temperature loading capacity limit during the charging process (taking account of a sufficient safety margin).

The control circuit can be configured to control the controllable semiconductor component based in part or on a whole upon a coolant temperature of the controllable semiconductor component. The coolant can be, for example, a fluid (gas and/or liquid) or a cooling element. By taking account of the coolant temperature, it is possible to avoid overheating of a coolant that serves for distributing and/or dissipating a heat energy generated by the semiconductor component.

The control circuit developed in respect of the second embodiment, can additionally be configured to control the controllable semiconductor component based in part or on a whole upon a measured and/or calculated load-current-dependent power loss of the controllable semiconductor component. It is thereby possible to lead the semiconductor component along its differential-voltage-dependent thermal loading capacity limit during the charging process (taking account of a sufficient safety margin in the set of characteristic curves).

The control circuit can be configured to minimize a charging time for a quantity of charge. This is advantageous in making it possible to shorten a waiting time until a load connected to a charging circuit controlled via the control circuit can be activated.

The control circuit can be configured to minimize, for a quantity of charge, a total ohmic loss caused by the charging. This is advantageous in minimizing the consumption of and the requirement for electrical energy.

The control circuit can be configured to minimize, for a quantity of charge, the product of a total ohmic loss caused by the charging of the quantity of charge and a charging time for the quantity of charge. This is advantageous in obtaining a compromise between economy and minimization of the charging time.

The control circuit can be configured to control the controllable semiconductor component based in whole or in part upon a safe operating range of the controllable semiconductor component. The safe operating range of a power semiconductor component is typically limited by a current limit, a thermal limit and a secondary breakdown limit. By taking into account the safe operating range, not only the thermal limit but also a current limit and/or a secondary breakdown limit can be taken into account in the control of the semiconductor component and an overloading of the semiconductor component can be avoided. Optionally, for better utilization of the capabilities of the semiconductor component, provision can be made for operating the semiconductor component for a short time temporarily with a higher power loss and/or a higher current intensity than would be permissible in continuous operation.

The control circuit can be configured to take into account a temperature dependence of the safe operating range of the controllable semiconductor component in the control of the controllable semiconductor component. This is advantageous in making it possible to utilize the safe operating range in the best possible way at different operating temperatures, even though its limits are dependent on the operating temperature.

The control circuit can be configured to drive the controllable semiconductor component at least temporarily in a saturation range and/or in a linear operating range of the controllable semiconductor component. At relatively high differential voltages, the semiconductor component is typically operated in the saturation range. In the saturation range, the drain-source path of a field effect transistor behaves approximately like a constant-current source whose current intensity can be set via the gate-source voltage.

If the semiconductor component is an n-channel FET (n-channel field-effect transistor) and the absolute value of the differential voltage is less than the absolute value of the pinch-off voltage, the semiconductor component is operated in a range designated as "ohmic range" or as "linear range."

If the semiconductor component is a field effect transistor, it passes through the ohmic range at the end of the charging process, that is to say at the conclusion of the reduction of the differential voltage.

The control circuit can be configured, for the driving of the controllable semiconductor component, to precalculate a first operating parameter for each of at least two driving alternatives and, depending on the precalculated values of the first operating parameter, to select a driving alternative from the at least two driving alternatives and to apply it in a driving of the controllable semiconductor component. By way of iteration steps, the charging process can thus be optimized even when the underlying optimization task is analytically unsolvable.

The control circuit can be figured to drive the controllable semiconductor component taking account of a characteristic curve, from which a value to be applied of a third operating parameter can in each case be gathered for present measured and/or calculated values of a second operating parameter. By way of preparatory establishment and storage of such a characteristic curve in the control circuit (in particular in a reference variable calculation component of the control circuit), it is possible to carry out computationally intensive optimization calculations in the development laboratory. The characteristic curve can be used in many chargers, as a result of which energy for new calculations is saved in the course of ongoing use. Each of the three operating parameters can be a vector composed of a plurality of operating parameters, whereby the vector comprises, in particular, a temperature and/or power indication.

An electronic charging circuit is developed by virtue of the fact it includes a control circuit in accordance with the invention. The advantages of the control circuit in accordance with the invention thereby become utilizable for a charging circuit.

A motor vehicle is developed by virtue of the fact that its on-board power supply system includes a charging circuit in accordance with the invention. The advantages of the charging circuit in accordance with the invention thereby become utilizable for a motor vehicle.

BRIEF DESCRIPTION OF THE DRAWINGS

Advantageous refinements of the invention will emerge from the dependent claims. An exemplary embodiment of the invention will be discussed in principle below on the basis of the drawing, in which:

FIG. 1 illustrates a schematic block diagram of an embodiment of a charging circuit in accordance with the invention.

DETAILED DESCRIPTION OF EMBODIMENTS

Figure 2A:
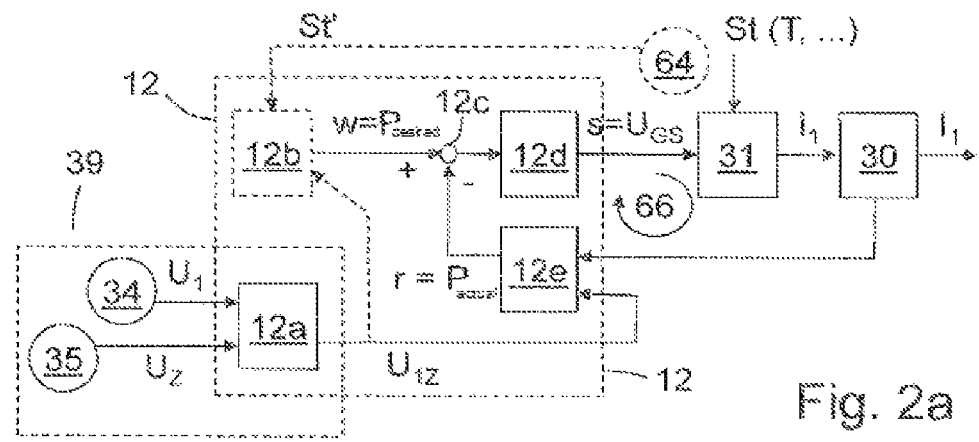
FIG. 2 illustrates schematic block diagrams with three possible functional structures of the control circuit in accordance with embodiments.

In the figures, the same reference signs are used in each case for corresponding components. Reference-sign-related explanations are therefore applicable throughout the figures, unless a different situation is apparent from the context.

As illustrated in FIG. 1, an embodiment of a charging circuit 10 of an on-board power supply system 11 includes a control circuit 12, a first supply terminal 14 and a second supply terminal 15 which connects a positive pole 16 and a negative pole 17, respectively, of a voltage source 18 (for example, a motor vehicle battery), and also a first load terminal 21 and a second load terminal 22 which connects an electrical load 24. One example of the application of the charging circuit 10 is the supply of an intermediate circuit capacitance $C_Z$ for supplying an inverter 28. The concept of the charging circuit 10 in accordance with the invention is suitable for direct-current and alternating-current loads 28, that is to say can also be applied, inter alia, for inrush current limiting of a transformer (see rush effect), of a switch mode power supply, of an incandescent lamp or of an electronic assembly comprising many buffer capacitors (tantalum electrolytic capacitors), and for start-up current limiting of an electric motor. From the point of view of the charging circuit 10, the electrical load 24 includes an intermediate circuit capacitance $C_Z$ and a load 28 connected in parallel therewith. For this reason, for the current $I_1$ here the term "load current"

is used, which forms a generic term with regard to the "charging current" of a purely capacitive load.

The first supply terminal 14 is connected to the first load terminal 21 via a series circuit composed of a current sensor 30 for detecting a load current $I_1$ and a first semiconductor component 31. The second supply terminal 15 is connected to the second load terminal 22 via a second semiconductor component 32. Alternatively, the current sensor 30 can also be arranged in the line section between the first semiconductor component 31 and the first load terminal 21 or between the second supply terminal 15 and the second semiconductor component 32 or between the second semiconductor component 32 and the second load terminal 22. The first semiconductor component 31 and second semiconductor component 32 in each case preferably comprises a field effect transistor (FET) arranged in the charging circuit 10 such that the load current 10 flows through the source-drain path (the channel) of the field effect transistor. The field effect transistor is preferably a MOSFET, more particularly, preferably a normally off MOSFET and/or an n-channel MOSFET.

For controlling the first semiconductor component 31 and second semiconductor component 32, the control circuit 12 is connected to the first semiconductor component 31 and to the second semiconductor component 32 via at least one respective control connection 33. Moreover, the control circuit 12 comprises at least one differential voltage sensor 39 for detecting a differential voltage $U_{1Z}$ at the first semiconductor component 31. A pair of voltage sensors 34, 35 can also be provided as the differential voltage sensor 39, such that the first voltage sensor 34 detects a first partial voltage $U_1$ of a first terminal 37 of the first semiconductor component 31 relative to a reference potential 36 and the second voltage sensor 35 detects a second partial voltage $U_Z$ of a second terminal 38 of the first semiconductor component 31 relative to the reference potential 36. The control circuit 12 can determine the differential voltage $U_{1Z}$ to be detected at the first semiconductor component 31 by analog and/or numerical formation of the difference $U_{1Z}=(U_1-U_Z)$ between the first $U_1$ and the second $U_Z$ voltage potentials.

Alternatively, it is possible to measure the differential voltage $U_{1Z}$ at the first semiconductor component 31 via an individual voltage sensor 39 by direct measurement of the differential voltage $U_{1Z}$ between the two terminals 37, 38 of the first semiconductor component 31, as a result of which the measurement of the differential voltage $U_{1Z}$ can be simplified and the measuring device for the differential voltage measurement can be completely integrated into the first semiconductor component 31 without leading out a further terminal and it is possible to avoid error accumulation as a result of a plurality of measurements.

Figure 3A:
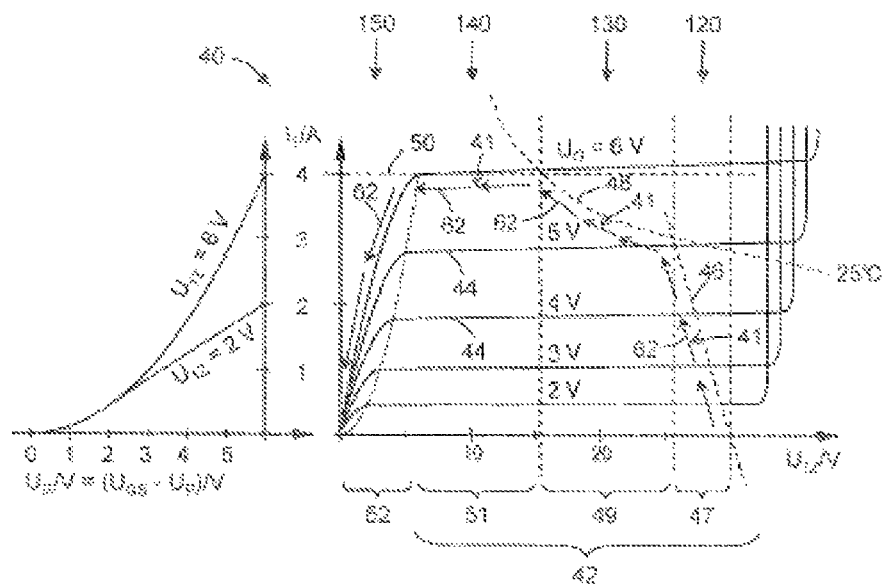
FIGS. 3A and 3B illustrate a schematic set of characteristic curves of an n-channel FET with operating range limits and a profile curve for an operating point of the n-channel FET in the charging circuit and a characteristic curve for calculating a gate-source voltage at the first semiconductor component as a function of a voltage difference at the first semiconductor component.
Figure 5A:
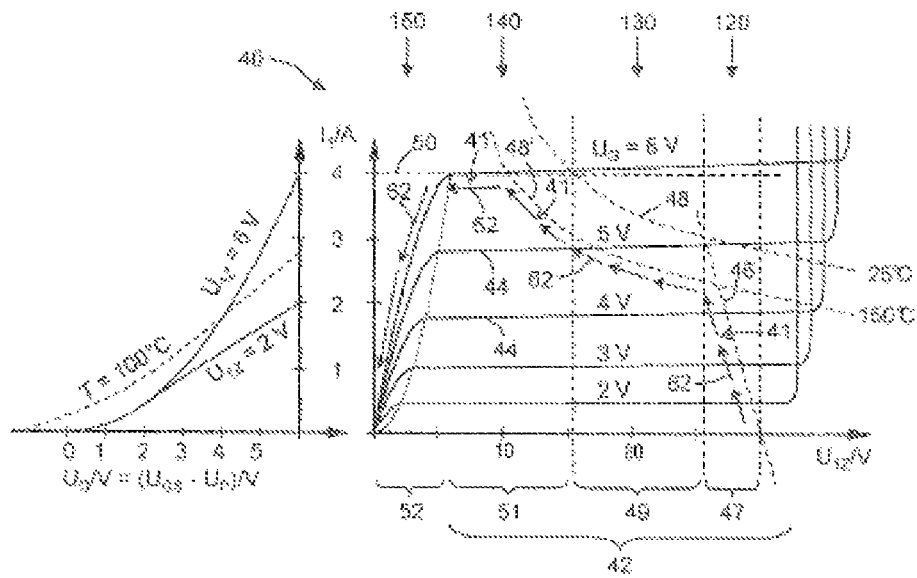
FIGS. 5A and 5B illustrate the set of characteristic curves from FIG. 3A with a profile curve for an operating point of the n-channel FET in the charging circuit taking account of an increased component temperature of the first semiconductor component and a characteristic curve for calculating a gate-source voltage at the first semiconductor component as a function of a voltage difference at the first semiconductor component.

A purpose of the control circuit 12 is to carry out the electronic precharging of the intermediate circuit capacitance $C_Z$ via analog driving of the first semiconductor component 31 (i.e. of the main switch last switched on), wherein the load current $I_1$ is controlled to a temporally varying target variable $I_{1desired}$ corresponding to a power loss $P_{desired}$ (heat generation per unit time) which the semiconductor component 31 (taking account of a safety margin 41, see FIGS. 3A and 5A for taking account of tolerances) can still just generate and dissipate with certainty in a nondestructive manner. FIGS. 3A and 5A illustrate show examples of sets 40 of characteristic curves which can differ considerably from the set of characteristic curves of the semiconductor component 31 in the concrete application. The considerations in accordance with the invention that are presented here should then be analogously applied in adapted form.

As illustrated in FIG. 2A, the still permissible power loss $P_{desired}$ is a reference variable w for a control loop 66, in which the present power loss $P_{actual}$ is used as a controlled variable r.

Figure 2B:
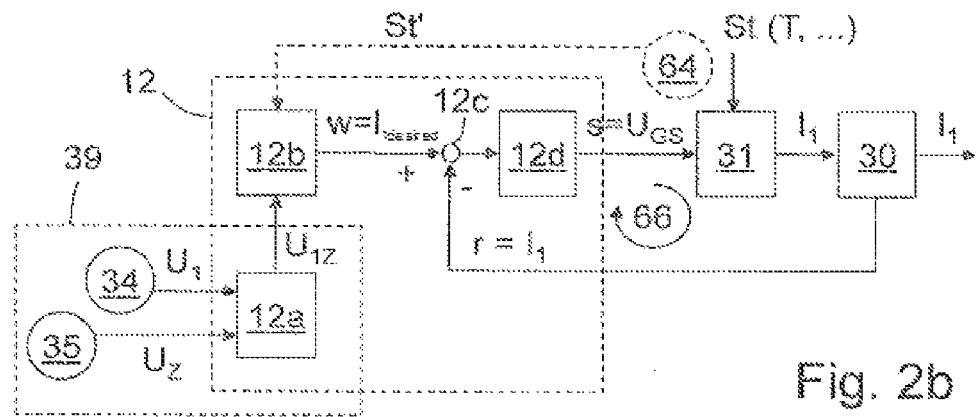

As illustrated in FIG. 2B, that load current $I_{1desired}$, which corresponds to the still permissible power loss $P_{desired}$ serves as a reference variable w for a control loop 66 and the present load current $I_1$ serves as a controlled variable r. In the embodiment in FIG. 2c, the differential voltage $U_{1Z}$ serves as a reference variable w for calculating or looking up that gate-source voltage $U_{GS}$ which corresponds to the still permissible power loss $P_{desired}$.

FIG. 2A illustrates a first embodiment of the control circuit 12, which comprises a voltage calculation component 12a, a power loss calculation component 12e, a difference-value forming unit 12c and a controller 12d. The partial voltages $U_1$ and $U_Z$ are detected via the two voltage sensors 34, 35 arranged upstream and downstream of the first semiconductor component 31. The differential voltage $U_{1Z}$ present at the first semiconductor component 31 is calculated via the voltage calculation component 12a. The voltage calculation component 12a together with the voltage sensors 34, 35 thus forms a differential voltage sensor 39.

Alternatively or additionally, the voltage $U_{1Z}$ between the terminals 37 and 38 of the semiconductor component 31 can also (without a detour via the reference potential 36) be detected directly via an individual differential voltage sensor 39. The present load current $I_1$ is measured via a current sensor 30 (generally present anyway).

Via the differential voltage $U_{1Z}$ thus determined and the present load current $I_1$ thus determined, the present power loss $P_{actual}=U_{1Z}*I_1$ in the semiconductor component 31 is calculated in the power loss calculation component 12e. While the first semiconductor component 31 is connected up, the power loss $P_{actual}$ is corrected to a permissible power loss $P_{desired}$ by the controller 12d. In this case, the semiconductor component 31 forms the controlled system; and the load current sensor 30 forms a measuring element (i.e., a probe) of the control loop 66. The present power loss $P_{actual}$ is the controlled variable r, and the gate-source voltage $U_{GS}$ forms the manipulated variable s of the control loop 66.

After the intermediate circuit voltage $U_Z$ has assumed the voltage $U_B$ of the voltage source 18, the first semiconductor component 31 can be fully activated. By correcting the present power loss $P_{actual}$ across the first semiconductor component 31 to the permissible power loss $P_{desired}$ (to the maximum permissible energy input), it is possible to achieve faster precharging than with the conventional precharging. In comparison with an alternative with a clocked solution, no series inductance is required in the supply line 61, and no or considerably less EMC interference than in the case of a clocked solution arises, such that the outlay for special EMC measures against such EMC interference is rendered unnecessary.

In accordance with embodiments of the invention, it is possible to take into account the fact that the magnitude of the permissible power loss $P_{desired}$ is typically dependent on the differential voltage $U_{1Z}$ at the first semiconductor component 31 (see FIG. 3a). If it is to be taken into account that the permissible power loss $P_{desired}$ is dependent on the differential voltage $U_{1Z}$, a reference variable calculation component 12b can be provided in the control circuit 12, which component calculates the permissible power loss $P_{desired}$ (=reference variable w) from the differential voltage $U_{1Z}$. Since the reference variable calculation component 12*b* is an option, it is depicted by dashed lines in FIG. 2A. The differential-voltage-dependent maximum permissible power loss $P_{desired}$ can be gathered, for example, from a set 40 of characteristic curves such as is illustrated in FIGS. 3*a* and 5*a*. The reference variable calculation component 12*b* is therefore an open-loop control that controls the control loop for the controlled variable r via the reference variable w.

In accordance with the second embodiment of the control circuit 12 as illustrated in FIG. 2B, the load current $I_1$ through the first semiconductor component 31 is controlled by closed-loop control without an interposed calculation of the power loss $P_{actual}$. In this case, the reference variable calculation component 12*b* calculates from the differential voltage $U_{1Z}$ a desired load current $I_{1desired}$ as a reference variable w for the control loop 66. Here, the present intensity of the load current I1 is the controlled variable r; and the gate-source voltage $U_{GS}$ is the manipulated variable s of the control loop 66.

Figure 2C:
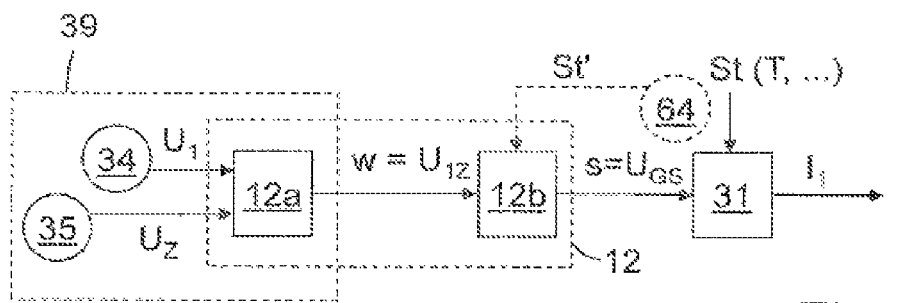
Figure 3B:
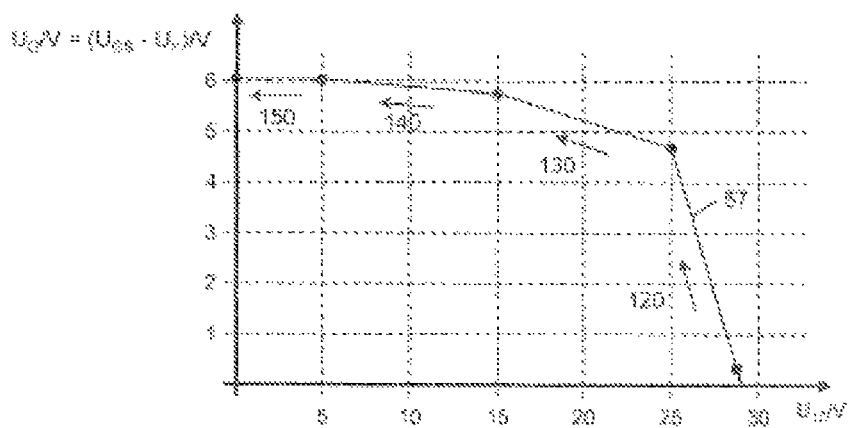

In accordance with the third embodiment of the control circuit 12 as illustrated in FIG. 2C, the load current $I_1$ through the first semiconductor component 31 is controlled by open-loop control, but not closed-loop control, in the manner dependent on the differential voltage $U_{1Z}$. For this purpose, the reference variable calculation component 12*b* calculates a gate-source voltage $U_{GS}$ with which the first semiconductor component 31 conducts a load current $I_1$ corresponding to the permissible power loss $P_{desired}$ and the desired load current $I_{1desired}$, these respectively being permissible in the case of the differential voltage $U_{1Z}$ currently present. Load current sensor 30, comparator 12*c* and controller 12*d* are not required for the third embodiment of the control circuit 12. If the relationship between $U_{1Z}$ and $U_{GS}$ has been calculated in advance or determined experimentally, the relationship can be stored in the reference variable calculation component 12*b* as a characteristic curve 57 (see FIG. 3B) and utilized for calculating or looking up the gate-source voltage $s=U_{GS}$ from the differential voltage $w=U_{1Z}$. The same correspondingly applies to the determination of the reference variable w of the reference variable calculation components 12*b* of the embodiments in FIGS. 2A and 2B.

The closed-loop controlled system 31 (see FIGS. 2A and 2B) or the open-loop controlled system 31 (see FIG. 2*c*) is influenced by interference variables St. As illustrated in FIG. 5A, the interference variables St can have an influence on a maximum permissible loading capacity of the first semiconductor component 31. By way of example, the component temperature T of the first semiconductor component 31 has an influence on a maximum permissible power loss $P_{desired}$ of the semiconductor component 31 (see reference signs 48, 48'). In order to take account of an interference variable St in the calculation of the reference variable w, the interference variable St can be measured by an interference variable sensor (for example, a temperature sensor 64) and the interference variable measurement value St' can be fed to the reference variable calculation component 12*b*, in order that the reference variable calculation component 12*b* calculates or looks up the reference variable w such that the influence of the interference variable St is taken into account in the calculation of the reference variable w. What can thereby be achieved is that a maximum loading capacity of the first semiconductor component 31 is utilized to the greatest possible extent even under changed boundary conditions (for example, temperature conditions), without overloading the semiconductor component 31 in the process.

On the basis of the example of an n-channel FET as first semiconductor component 31, it will be considered below how an activation method can be adapted to properties of the first semiconductor component 31. In this case, the differential voltage $U_{1Z}$ corresponds to a source-drain voltage of the FET.

Figure 4:
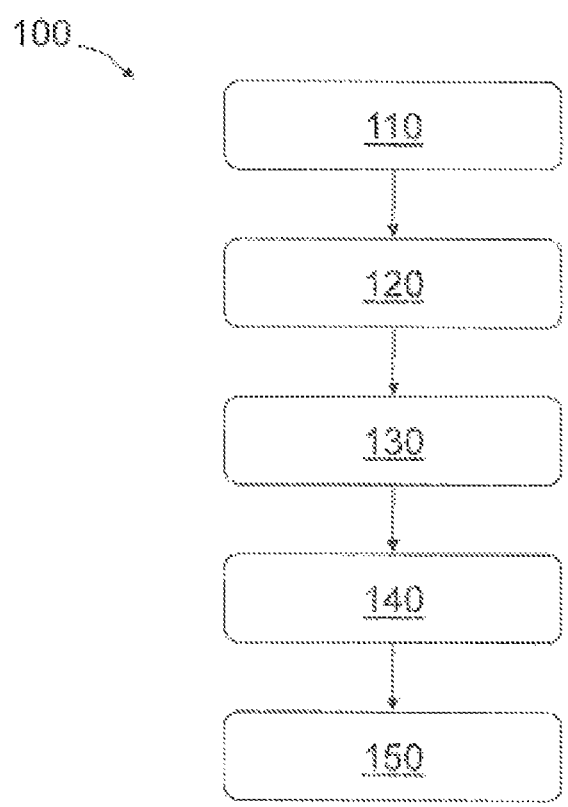
FIG. 4 illustrates a schematic flowchart of an activation method of an arrangement composed of a voltage source, a charging circuit and an intermediate circuit capacitance.

FIG. 3A illustrates a set 40 of characteristic curves of an n-channel FET while FIG. 4 illustrates a flowchart for an activation 100 of the arrangement 10, 18, $C_Z$, which comprises at least one of the following steps: a first step 110 in which the control circuit 12 switches on the second semiconductor component 32 (the requisite driving is not illustrated in the figures); and a second step 120 in which the gate-source voltage $U_{GS}=U_P+U_G$ is increased in steps or continuously beyond the pinch-off voltage $U_P$ of the FET (see FIG. 3B), such that the source-drain path of the first semiconductor switch 31 (proceeding from a resistance of approximately infinite magnitude) firstly becomes conducting with a low load current $I_1$ and then with higher and higher currents (see FIG. 3A).

Upon activation of the arrangement 10, 18, $C_Z$ composed of voltage source 18, charging circuit 10 and intermediate circuit capacitance $C_Z$, the intermediate circuit capacitance $C_Z$ is typically discharged. Therefore, at the beginning of switch-on, the source-drain voltage $U_{1Z}$ is still almost of the same magnitude as the voltage $U_B$ of the voltage source 18. In order to utilize the performance of the first semiconductor component 31, it is expedient to operate it in the saturation range 42 (pinch-off range) at the beginning of the activation phase. The virtually horizontal profile of the characteristic curves 44 in the pinch-off range 42 shows that the pinch-off range 42 is an operating range in which the FET 31 behaves approximately like a current source whose current intensity $I_1$ can be set via the gate-source voltage $U_{GS}$. In the pinch-off range 42, there is the risk of the FET 31 being heated to an excessively great extent and damaged if a current limit 150, a thermal limit 48 or a secondary breakdown limit 46 is exceeded. At a high source-drain voltage $U_{1Z}$, the secondary breakdown limit 46 typically firstly determines the maximum permissible current intensity $I_1$ (see FIG. 3A). In this partial operating range 47, this results in a (typically approximately linear) relationship for the maximum permissible gate-source voltage $U_{GS}$ depending on the source-gate voltage $U_{1Z}$ (see FIG. 3B), in order that the load current $I_1$ through the FET 31 does not become excessively high.

Upon transition from the second step 120 to the third step 130, the drain-source voltage $U_{1Z}$ has decreased in the meantime as a result of the charging of the intermediate circuit capacitance $C_Z$ to an extent such that the FET 31 is operated in a partial operating range 49 in which the thermal limit 48 determines the maximum permissible intensity of the load current $I_{1desired}$. This results in a (typically approximately hyperbolic) relationship for the maximum permissible load current $I_1$ (see FIG. 3*a*) and for the maximum permissible gate-source voltage $U_{GS}$ (see FIG. 3*b*) depending on the source-drain voltage $U_{1Z}$, in order that the load current $I_1$ through the FET 31 does not become excessively high.

Upon transition from the third step 130 to the fourth step 140, the drain-source voltage $U_{1Z}$ has decreased even further in the meantime as a result of the charging of the intermediate circuit capacitance $C_Z$, such that the FET 31 is operated in a partial operating range 51 in which the current limit 50 determines that intensity of the load current $I_{1desired}$ which is still just permissible, in order that the FET 31 is not damaged (see FIG. 3*a*). This in turn yields the maximum permissible gate-source voltage $U_{GS}$ (see FIG. 3b), in order that the load current $I_1$ through the FET 31 does not become excessively high.

Upon transition from the fourth step 140 to the fifth step 150, the drain-source voltage $U_{1Z}$ has decreased even further in the meantime as a result of the charging of the intermediate circuit capacitance $C_Z$, such that the FET 31 is operated in the ohmic range 52 (so-called linear range). The range 52 is designated as the 'ohmic range' because the characteristic curves 44 here run approximately linearly through the zero point, such that the FET 31 here behaves like an ohmic resistor whose resistance is controllable by the gate-source voltage $U_{GS}$. In this range 52, too, the current limit 50 determines that load current intensity $I_{1\,desired}$ which is still just permissible, in order that the FET 31 is not damaged (see FIG. 3a). Depending on the type of the first semiconductor component 31, in the ohmic range 52 there can also be a gate-source voltage $U_{GS}$ which should not be exceeded.

Depending on the profile of the performance limits 46, 48, 50, the activation method 100 can also be applied such that the second 120 and/or the third 130 method step are/is skipped.

The illustrated control method 100 for the first semiconductor component 31 makes it possible to influence the load current $I_1$ across the different operating ranges 47, 49, 51, 52 such that the current is as high as possible, without exceeding a permissible magnitude. What is thus achieved is that a performance and loading capacity of a first semiconductor component 31 present are utilized as well as possible, without jeopardizing the functionality of the component. With the adaptive full utilization of the load current intensity $I_{1\,desired}$ which is maximally permissible depending on the differential voltage $U_{1Z}$, upon activation of the charging circuit 10 a maximum charge flux $I_{1\,desired}$ between voltage source 18 and intermediate circuit capacitance $C_Z$ is obtained and, consequently, a best possible shortening of the charging process until complete reduction of the voltage difference $U_{1Z}$ between voltage source 18 and intermediate circuit capacitance $C_Z$ is achieved. The control circuit can therefore drive the controllable semiconductor component 31 taking account of a characteristic curve 57 from which a value to be applied of a third operating parameter $U_{GS}$ can respectively be gathered for presently measured and/or calculated values of a second operating parameter $U_{1Z}$.

During the charging process, a defined total quantity of charge $Q=U_B*C_Z$ is to be conveyed from the voltage source 18 to the intermediate circuit capacitance $C_Z$. The quantity of charge Q corresponds to an integral of the load current I1 over the charging time. Therefore, the charging time is all the shorter, the higher the load current intensities I1 that occur during the charging process 100. Since the 'upper' characteristic curves 44 in the set 40 of characteristic curves represent the higher current intensities I1, traversal of characteristic curves 44 that lie as far up as possible in the set 40 of characteristic curves leads to a maximum temporal shortening of the charging process 100.

On account of the nonlinearity of the characteristic curves 44 and the dependence of the set 40 of characteristic curves on a component temperature T of the semiconductor component 31, depending on the application it may be desirable, by optimizing the profile of the profile curve 62 for the operating point of the first semiconductor component 31 in the set 40 of characteristic curves, by way of example, to minimize a charging time or a total ohmic loss caused by the charging process, or a product of a total ohmic loss caused by the charging and a charging time. One development of the control circuit 10 provides for the latter to precalculate such an optimization variable for at least two driving alternatives $w=w_1$, $w=w_2$ and, depending on the precalculated values of the optimization variable, to select a driving alternative from the at least two driving alternatives $w_1$, $w_2$ and to apply it in a driving of the controllable semiconductor component 31.

Figure 5B:
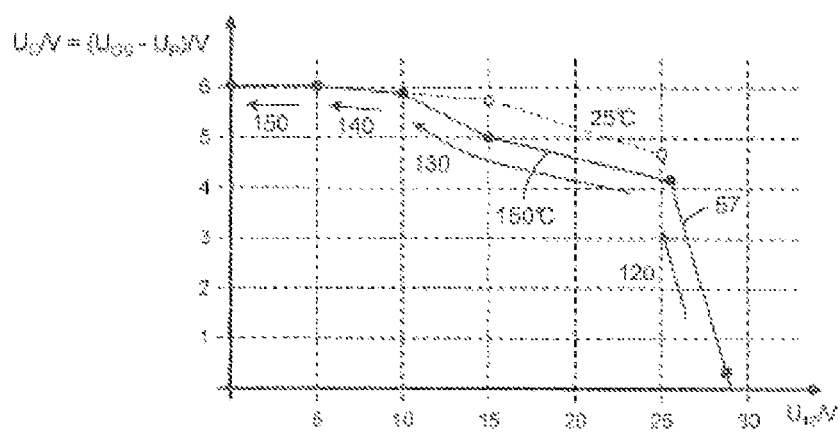

The profile curve 62 illustrated in FIG. 5a for an operating point of the n-channel FET in the charging circuit 10 takes account of a change in the maximum power loss $P_{desired}$ that can be afforded tolerance on account of an increased component temperature T of the first semiconductor component 31. On account of the shift of the thermal limit from 48 to 48', in the thermally limited partial operating range 49 only lower load current intensities $I_{1\,desired}$ than in the case of operation illustrated in FIG. 3A can be afforded tolerance. Consequently, when there is an increase in the component temperature T of the first semiconductor component 31 (with the semiconductor component 31 being unchanged), a lengthening of the minimum charging time is unavoidable. The partial operating range 49 has to be traversed with a lower gate-source voltage $U_{GS}$ at an increased component temperature T (see FIG. 5B).

Apart from the change in the thermal limit 48, the characteristic curves 44 and the other limits 46, 50 typically also change as a result of a change in the component temperature T of the first semiconductor component 31. This substantive matter is not illustrated in the figures (apart from the fact that the dashed line in the partial diagram on the left in FIG. 5A schematically indicates how the channel current $I_1$ typically changes when there is an increase in the component temperature). These temperature dependencies should be taken into account when calculating the reference variable w. For this purpose, it is expedient to provide a plurality of sets 40 of characteristic curves in the control circuit 12, each of which sets describes the behavior of the first semiconductor component 31 for a different component temperature T. In particular, in the reference variable calculation component 12b it is possible to provide a set of characteristic curves (not illustrated in the figures) comprising a plurality of characteristic curves 57, of which each characteristic curve 57 respectively predefines for a different component temperature T the reference variable w (in the embodiments in FIGS. 2A and 2B) or the manipulated variable s (in the embodiment in FIG. 2C) depending on the differential voltage $U_{1Z}$.

In order to select from the sets 40 of characteristic curves and/or from the set of characteristic curves for the characteristic curves 57 the set 40 of characteristic curves presently to be applied and/or the characteristic curve 57 to be applied, it is possible to provide a temperature sensor 64 (see FIG. 1), via which the control circuit 12 can detect the present component temperature T of the first semiconductor component 31 and/or a coolant temperature of the first semiconductor component 31. Alternatively, with a temperature model (for example, a thermal equivalent circuit diagram) of the first semiconductor component 31, it is also conceivable to calculate or estimate the present temperature T via a component temperature calculation module 64 on the basis of previous or present loadings as a result of load currents $I_1$.

Furthermore, for the purpose of optimizing the optimization variable in the control circuit 12 (in particular in the reference variable calculation component 12b), it is also possible to take account of the fact that the semiconductor component 31 can momentarily temporarily generally be operated with a significantly higher power loss and/or a higher current intensity than in continuous operation.

The circuit principles described can also be applied with opposite polarity. Analog and/or digital electrical signals represented in the form of voltages in the exemplary embodiments can alternatively or additionally, also be represented as (impressed) currents. Via amplifiers or converters, voltages or currents mentioned in the description can be rescaled on the path from their respective source to their respective sink. Analog or digital signals represented in the form of voltages or currents can be linearly or nonlinearly coded in accordance with a known method or in accordance with a method not yet known nowadays. Examples of coding methods that can be applied are pulse width modulation and pulse code modulation. The analog and/or digital signals can be transmitted electrically, optically or by radio. The analog and/or digital signals can be transmitted by space division multiplex (that is to say via different lines), by time division multiplex or by code division multiplex. The analog and digital signals can be transmitted via one or a plurality of bus systems. By way of example, the second operating parameter, alongside the voltage difference $U_{1Z}$, can also comprise information about a component temperature T of the first semiconductor component 31.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS

10 Charging circuit
12 Control circuit
12*a* Differential voltage calculation component
12*b* Reference variable calculation component
12*c* Comparator; difference-value forming unit
12*d* Controller
12*e* Controlled variable calculation component
13 Driving and potential isolation
14 First supply terminal
Second supply terminal
16 Positive pole of the voltage source
17 Negative pole of the voltage source
18 Voltage source
21 First load terminal
22 Second load terminal
24 Electrical load
28 Inverter; load
30 Load current sensor
31 First semiconductor component
32 Second semiconductor component
33 Control connection
34 First voltage sensor
35 Second voltage sensor
36 Reference potential
37 First terminal of the first semiconductor component
38 Second terminal of the first semiconductor component
39 Differential voltage sensor
40 Set of characteristic curves
41 Safety margin
42 Saturation range (pinch-off range)
44 Characteristic curve
46 Secondary breakdown limit
47 Operating range with secondary breakdown limit
48 Thermal limit
49 Operating range with thermal limit
50 Current limit
51 Operating range with current limit
52 Ohmic range (linear range)
57 Characteristic curve
61 Supply line
62 Profile curve for operating point
64 Interference variable sensor/temperature sensor/temperature calculation module
66 Control loop
100 Activation method
110 First step
120 Second step
130 Third step
140 Fourth step
150 Fifth step
$C_Z$ Intermediate circuit capacitance
$I_1$ Load current; load current
$P_{actual}$ Measured or calculated power loss
$P_{desired}$ Maximum permissible power loss
r Controlled variable
s Manipulated variable
St Interference variable
St' Interference variable measurement value
T Component temperature
$U_B$ Battery voltage
$U_G$ $U_{GS}$–$U_P$
$U_{GS}$ Gate-source voltage
$U_P$ Pinch-off voltage
$U_Z$ Voltage downstream of the first semiconductor component
$U_1$ Voltage upstream of the first semiconductor component
$U_{1Z}$ Differential voltage; voltage drop
w Reference variable
$w_1$ First driving alternative
$w_2$ Second driving alternative

What is claimed is:

1. A control circuit comprising:
a controllable semiconductor component; and
a circuit which indirectly limits a load current which flows through the controllable semiconductor component, the circuit comprising a voltage sensor for detecting a voltage between a first terminal of the controllable semiconductor component and a second terminal of the controllable semiconductor component, the voltage sensor being configured to output a value corresponding to the detected voltage,
wherein the circuit is configured to control the controllable semiconductor component based on a value corresponding to a load-current-dependent power loss of the controllable semiconductor component, the load-current-dependent power loss being measured and/or calculated based at least in part on the outputted value corresponding to the detected voltage, and
wherein the circuit is configured to minimize a total ohmic loss caused by charging a quantity of charge and a charging time for the quantity of charge.

2. The control circuit of claim 1, wherein the circuit is configured to control the controllable semiconductor component based upon a safe operating range of the controllable semiconductor component.

3. The control circuit of claim 1, wherein the circuit is configured to drive the controllable semiconductor component at least temporarily in a saturation range and/or in a linear operating range of the controllable semiconductor component.

4. The control circuit of claim 1, wherein the circuit is configured to precalculate a first operating parameter for each of at least two driving alternatives and, depending on the precalculated values of the first operating parameter, to select a driving alternative from the at least two driving alternatives and to apply the selected driving alternative to drive the controllable semiconductor component.

5. The control circuit of claim 1, wherein the circuit is configured to drive the controllable semiconductor component based upon a characteristic curve, from which a value to be applied of a third operating parameter can be gathered for present measured and/or calculated values of a second operating parameter.

6. A control circuit comprising:
a circuit which indirectly limits a load current which flows through a controllable semiconductor component, the circuit comprising a voltage sensor configured to detect a voltage between a first terminal of the controllable semiconductor component and a second terminal of the controllable semiconductor component and to output a value corresponding to the detected voltage,
wherein the circuit is configured to control the controllable semiconductor component based on a value corresponding to a load-current-dependent temperature of the controllable semiconductor component, the load-current-dependent component temperature being measured and/or calculated based at least in part on the outputted value of the detected voltage, and
wherein the circuit is configured to minimize a total ohmic loss caused by charging a quantity of charge and a charging time for the quantity of charge.

7. The control circuit of claim 6, wherein the circuit is configured to control the controllable semiconductor component based upon a coolant temperature of the controllable semiconductor component.

8. The control circuit of claim 6, wherein the circuit is configured to control the controllable semiconductor component based upon a measured load-current-dependent power loss of the controllable semiconductor component and/or a calculated load-current-dependent power loss of the controllable semiconductor component.

9. The control circuit of claim 6, wherein the circuit is configured to control the controllable semiconductor component based upon a safe operating range of the controllable semiconductor component.

10. The control circuit of claim 9, wherein the safe operating range of the controllable semiconductor component is based upon temperature.

11. The control circuit of claim 6, wherein the circuit is configured to drive the controllable semiconductor component at least temporarily in a saturation range and/or in a linear operating range of the controllable semiconductor component.

12. The control circuit of claim 6, wherein the circuit is configured to precalculate a first operating parameter for each of at least two driving alternatives and, depending on the precalculated values of the first operating parameter, to select a driving alternative from the at least two driving alternatives and to apply the selected driving alternative to drive the controllable semiconductor component.

13. The control circuit of claim 6, wherein the circuit is configured to drive the controllable semiconductor component based upon a characteristic curve, from which a value to be applied of a third operating parameter can in each case be gathered for present measured and/or calculated values of a second operating parameter.

14. A motor vehicle comprising:
an on-board electrical power supply system comprising a charging circuit, the charging circuit comprising:
a controllable semiconductor component configured to limit the load current; and
a control circuit which indirectly limits a load current which flows through the controllable semiconductor component, the circuit comprising a voltage sensor configured to detect a voltage between a first terminal of the controllable semiconductor component and a second terminal of the controllable semiconductor component and to output a value corresponding to the detected voltage,
wherein the control circuit is configured to control the controllable semiconductor component based on a value corresponding to a predetermined factor that occurs in the controllable semiconductor component, the predetermined factor being measured and/or calculated based at least in part on the outputted value corresponding to the detected voltage, and
wherein the circuit is configured to minimize a total ohmic loss caused by charging a quantity of charge and a charging time for the quantity of charge.

* * * * *